No. 756,621. PATENTED APR. 5, 1904.
H. W. GOODALL.
ROD PACKING.
APPLICATION FILED JULY 17, 1903.
NO MODEL.
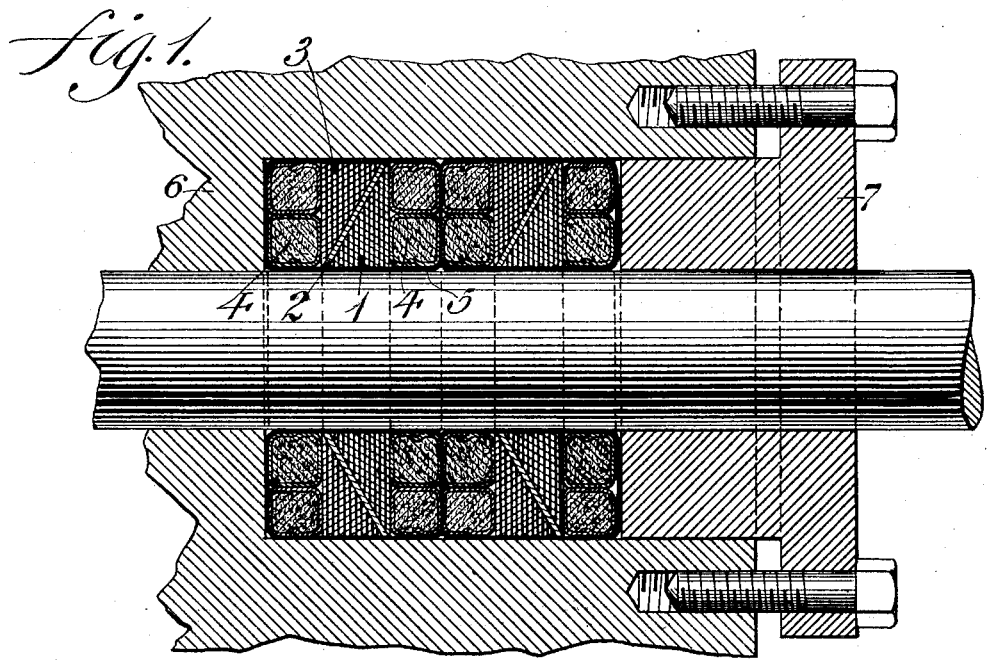
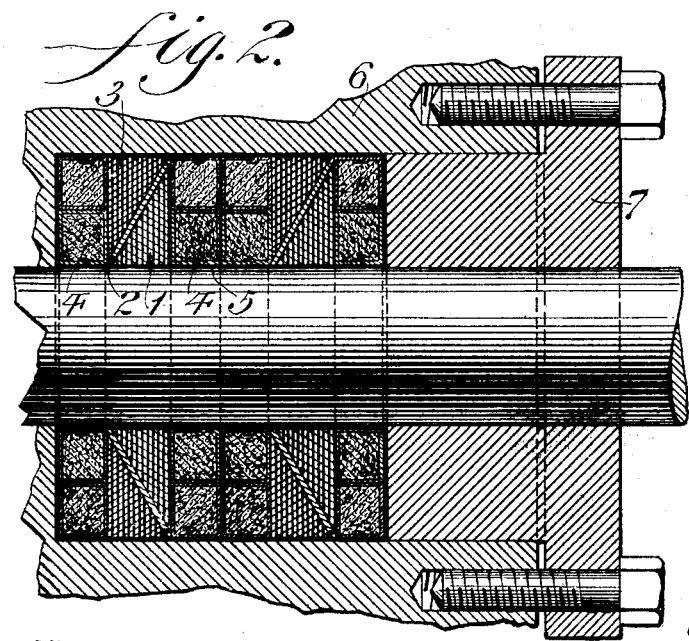
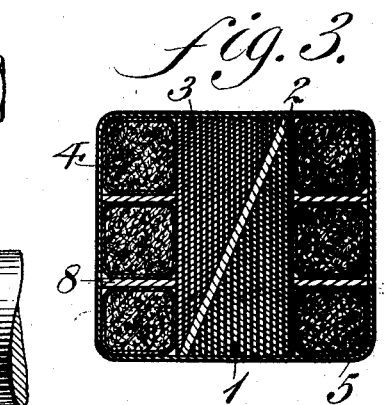
Witnesses
L. Doaville,
P. J. Angle.
Inventor
Howard W. Goodall.
By Wiedersheim & Fairbanks,
Attorneys No. 756,621.

Patented April 5, 1904.

UNITED STATES PATENT OFFICE.

HOWARD W. GOODALL, OF PHILADELPHIA, PENNSYLVANIA, ASSIGNOR TO MULCONROY COMPANY, A CORPORATION OF NEW JERSEY.

ROD-PACKING.

SPECIFICATION forming part of Letters Patent No. 756,621, dated April 5, 1904.

Application filed July 17, 1903. Serial No. 165,933. (No model.)

*To all whom it may concern:*

Be it known that I, HOWARD W. GOODALL, a citizen of the United States, residing in the city and county of Philadelphia, State of Pennsylvania, have invented a new and useful Improvement in Rod-Packing, of which the following is a specification.

My invention relates to packing for rods and other purposes.

It consists of wedge-shaped pieces of rubber fabric and means for compressing and lubricating them, while insuring their durability.

It also consists of a novel mode of inserting strips of lead or other ductile material, by which the packing may be easily formed into ring or other shapes.

It further consists of novel features of construction, all as will be hereinafter fully set forth.

Figures 1 and 2 represent, partly in section and partly in elevation, a stuffing-box packed with my packing before and after compression. Fig. 3 represents a section of a modified form of my packing.

Similar numerals of reference indicate corresponding parts in the figures.

Referring to the drawings, 1 designates a wedge-shaped piece of rubber and cloth fabric or the like the plies of which, it is to be observed, run at a right angle with the face of the packing to be abraded. Firmly secured, as by vulcanizing, to the diagonal side of the wedge 1 is a strip of rubber 2, the outer surface of which is smooth and may be coated with graphite or the like. Against this smooth surface rides a secured wedge of rubber fabric 3, shown as of like size and shape with the wedge 1. At each side of the rectangular figure formed by the juxtaposition of the wedges 1 and 3 are cushions 4, shown on Figs. 1 and 2 as two in number. Each cushion 4 is formed of a roving of hemp, jute, cotton, or any desired absorptive fiber, which may be woven or plaited, if preferred, and which may be inclosed in a braided cover and filled with oil or any desired lubricant. The cushions 4 and the wedges 1 and 3 are then assembled, as shown, and the packing completed by braiding around them a cover 5, the whole forming a substantially rectangular rod or strip. When used for a piston-rod packing, the strip may be cut diagonally and wound spirally or cut to length and formed into rings. The helical coil or the rings are then placed in a stuffing-box 6, as shown in Fig. 1, and compressed by screwing home to the follower 7, as in Fig. 2.

It will be seen that the rubber strip 2 serves to protect the wedge 1, to which it is secured, from disintegration—*i. e.*, the extremely short plies of cloth are held from being torn from the rest of the fabric and blown out of the box. The plies being presented to the running-rod "end on" always offer the same resistance as the packing wears down, so that the packing if properly compressed is always tight. When the strip is turned to expose alternate layers of cloth and rubber to the rod, the degree both of adhesion and resistance to leakage constantly varies. It will also be noted that by the use of a plurality of separate braided cushions on each side of the packing-wedges a sharp-cornered and compact packing can be built up, whereby the amount of compression required is greatly reduced.

Fig. 3 of the drawings shows a packing of large size constructed as above described, except that a larger number, shown as 3, of separate lubricating and compressing cushions are employed and that strips 8, of lead, metal, alloy, or molded composition of a ductile and non-resilient nature, are placed between the cushions 4. By reason of these strips the packing when cut and bent to the desired form will retain the form given it while being placed in position. It will be noted that the strips 8 are merely placed between the cushions 4 when the packing is assembled for the final braiding, so that they add practically nothing to the labor cost of the packing.

It will be evident that various changes may be made by those skilled in the art which will come within the scope of my invention, and I do not, therefore, desire to be limited in every instance to the exact construction herein shown and described.

By the phrase "rubber or like fabric" when used in the claims it will be understood that I include alternate plies of cotton, duck, or other textile material and of rubber or rubber substitute vulcanized together to form a solid mass or strip.

Having thus described my invention, what I claim as new, and desire to secure by Letters Patent, is—

1. A packing comprising a wedge-shaped strip composed of alternate plies of textile material and rubber vulcanized together and presenting the ends of its plies to abrasion with a strip of rubber firmly adhered to the diagonal side of said wedge and means for holding said strip firmly in position.

2. A packing comprising a wedge-shaped strip composed of alternate plies of textile material and rubber vulcanized together and presenting the ends of its plies to abrasion, a strip of rubber firmly adhered to the diagonal side of said wedge, a second wedge of like form and material movable on said strip and cushions on each side of said wedges.

3. A packing comprising a plurality of wedge-shaped portions and a plurality of separate cushions at each side of said wedges.

4. A packing comprising a pair of similarly-shaped wedges adjacent and movable on each other and a plurality of separate cushions at each side of said wedges.

5. A packing comprising a wedge-shaped strip of rubber or like fabric presenting the ends of its plies to abrasion, a strip of rubber firmly adhered to the diagonal side of said wedge, a second wedge of like form and material movable on said strip and a plurality of separate cushions on each side of said wedges.

6. A packing comprising a plurality of wedge-shaped portions, a plurality of separate cushions at each side of said wedges and a strip of ductile material interposed between said cushions.

HOWARD W. GOODALL.

Witnesses:
 JOHN A. WIEDERSHEIM,
 GEO. L. COOPER.